(12) United States Patent
Narang et al.

(10) Patent No.: US 9,407,506 B2
(45) Date of Patent: Aug. 2, 2016

(54) MULTI-ENTITY MANAGEMENT

(75) Inventors: Nitin Narang, Hyderabad (IN); Mahesh Narayanan, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 13/230,529

(22) Filed: Sep. 12, 2011

(65) Prior Publication Data

US 2013/0067048 A1 Mar. 14, 2013

(51) Int. Cl.
*G06F 15/177* (2006.01)
*H04L 12/24* (2006.01)
*H04L 29/12* (2006.01)

(52) U.S. Cl.
CPC ........ *H04L 41/0883* (2013.01); *H04L 41/0806* (2013.01); *H04L 41/0813* (2013.01); *H04L 41/0889* (2013.01); *H04L 41/5048* (2013.01); *H04L 61/2061* (2013.01); *H04L 61/2076* (2013.01)

(58) Field of Classification Search
CPC ............ H04L 41/0883; H04L 41/0889; H04L 41/5048; H04L 41/0813; H04L 41/0806; H04L 61/2061; H04L 61/2076
USPC ......................................................... 709/221
See application file for complete search history.

(56) References Cited

U.S. PATENT DOCUMENTS

| | | | |
|---|---|---|---|
| 6,098,098 A * | 8/2000 | Sandahl et al. ............... | 709/221 |
| 6,219,715 B1 * | 4/2001 | Ohno et al. .................... | 709/245 |
| 6,553,568 B1 * | 4/2003 | Fijolek et al. ................. | 725/111 |
| 6,643,694 B1 * | 11/2003 | Chernin ........................ | 709/223 |
| 6,823,454 B1 * | 11/2004 | Hind et al. .................... | 713/168 |
| 7,051,089 B1 * | 5/2006 | Johnson et al. ............... | 709/220 |
| 7,068,597 B1 * | 6/2006 | Fijolek et al. ................. | 370/230 |
| 7,107,326 B1 * | 9/2006 | Fijolek et al. ................. | 709/220 |
| 7,185,079 B1 * | 2/2007 | Bainbridge et al. .......... | 709/223 |
| 7,409,709 B2 * | 8/2008 | Smith et al. ...................... | 726/15 |
| 7,529,818 B2 * | 5/2009 | Halpern et al. ............... | 709/221 |
| 7,587,493 B1 | 9/2009 | Sheth | |
| 7,698,394 B2 * | 4/2010 | Helmerich .................... | 709/222 |
| 7,882,169 B1 * | 2/2011 | Droms et al. ................. | 709/203 |

(Continued)

FOREIGN PATENT DOCUMENTS

| | | |
|---|---|---|
| CN | 101232395 A | 7/2008 |
| WO | 9107719 A2 | 5/1991 |

OTHER PUBLICATIONS

"Managing DHCP Superscopes", Retrieved at <<http://technet.microsoft.com/en-us/library/dd183662(WS.10).aspx>>, Oct. 16, 2008, p. 1.

(Continued)

*Primary Examiner* — Ario Etienne
*Assistant Examiner* — Blake Rubin
(74) *Attorney, Agent, or Firm* — Judy Yee; Danielle Johnston Holmes; Micky Minhas

(57) ABSTRACT

In embodiments of multi-entity management, a multi-entity system can include an infrastructure service (DHCP) that services client devices configured for network connectivity on a network. The multi-entity system also includes server devices configured for network configuration settings control and management of the client devices on the network. A multi-entity manager instantiates a configuration dialog for display with user-selectable controls that are selectable to initiate a single-step configuration operation of one or more of the network configuration settings at the server devices.

18 Claims, 5 Drawing Sheets

(56) References Cited

U.S. PATENT DOCUMENTS

| | | | |
|---|---|---|---|
| 7,916,748 B2* | 3/2011 | Ma | 370/457 |
| 2002/0082819 A1 | 6/2002 | Ferguson et al. | |
| 2002/0133573 A1* | 9/2002 | Matsuda et al. | 709/220 |
| 2002/0143949 A1* | 10/2002 | Rajarajan et al. | 709/226 |
| 2002/0158900 A1* | 10/2002 | Hsieh et al. | 345/738 |
| 2002/0178380 A1* | 11/2002 | Wolf et al. | 713/201 |
| 2003/0009540 A1* | 1/2003 | Benfield et al. | 709/220 |
| 2003/0147395 A1* | 8/2003 | Gutknecht et al. | 370/393 |
| 2003/0177218 A1* | 9/2003 | Poirot et al. | 709/223 |
| 2003/0229686 A1 | 12/2003 | Kortright | |
| 2004/0261116 A1* | 12/2004 | Mckeown et al. | 725/109 |
| 2005/0044265 A1* | 2/2005 | Vinel et al. | 709/238 |
| 2005/0055575 A1* | 3/2005 | Evans et al. | 713/201 |
| 2005/0097610 A1* | 5/2005 | Pedlow et al. | 725/80 |
| 2005/0198215 A1* | 9/2005 | Helmerich | 709/220 |
| 2005/0253722 A1* | 11/2005 | Droms et al. | 340/572.1 |
| 2006/0050862 A1* | 3/2006 | Shen et al. | 379/219 |
| 2006/0079999 A1* | 4/2006 | Husein | 700/275 |
| 2006/0091999 A1* | 5/2006 | Howarth | 340/10.3 |
| 2006/0106585 A1* | 5/2006 | Brown et al. | 703/1 |
| 2006/0236095 A1* | 10/2006 | Smith et al. | 713/153 |
| 2006/0248229 A1* | 11/2006 | Saunderson et al. | 709/245 |
| 2007/0061458 A1* | 3/2007 | Lum | 709/225 |
| 2007/0253344 A1* | 11/2007 | Frost et al. | 370/254 |
| 2007/0253377 A1* | 11/2007 | Janneteau et al. | 370/338 |
| 2007/0268516 A1* | 11/2007 | Bugwadia et al. | 358/1.15 |
| 2008/0025299 A1* | 1/2008 | Agarwal et al. | 370/389 |
| 2008/0172476 A1* | 7/2008 | Daniel et al. | 709/220 |
| 2008/0222275 A1* | 9/2008 | Yumoto | 709/220 |
| 2008/0282325 A1* | 11/2008 | Oyama et al. | 726/4 |
| 2009/0106404 A1* | 4/2009 | Christenson | 709/222 |
| 2009/0217346 A1* | 8/2009 | Manring et al. | 726/1 |
| 2009/0279454 A1* | 11/2009 | Wacker et al. | 370/255 |
| 2010/0180016 A1* | 7/2010 | Bugwadia et al. | 709/220 |
| 2010/0191839 A1* | 7/2010 | Gandhewar et al. | 709/220 |
| 2010/0328132 A1* | 12/2010 | Reams et al. | 341/176 |
| 2011/0010463 A1* | 1/2011 | Christenson et al. | 709/245 |
| 2011/0238793 A1* | 9/2011 | Bedare et al. | 709/220 |
| 2013/0326014 A1* | 12/2013 | Niu et al. | 709/217 |

OTHER PUBLICATIONS

"Ridgeline Network and Service Management", Retrieved at <<http://extremenetworks.com/products/Ridgeline.aspx>>, Retrieved Date: Jul. 28, 2011, p. 1.

"VitalQIP DNS/DHCP IP Management Software & Appliance", Retrieved at <<http://enterprise.alcatel-lucent.com/?product=VitalQIP&page=overview, Retrieved Date: Jul. 28, 2011, pp. 2.

"Proteus IP Address Management Solution (IPAM)", Retrieved at <<http://www.bluecatnetworks.com/products/proteus-ip-address-management/overview Manage Core Services>>, Retrieved Date: Jul. 28, 2011, p. 1.

"Office Action Issued In Chinese Patent Application No. 201210335704.5" Mailed Date: Dec. 1, 2014, 12 Pages.

"Second Office Action Issued in Chinese Patent Application No. 201210335704.5", Mailed Date: Jun. 24, 2015, 7 Pages.

Third Office Action Issued in Chinese Patent Application No. 201210335704.5, mailed Jan. 13, 2016, 10 Pages.

* cited by examiner

MULTI-ENTITY MANAGEMENT

BACKGROUND

Large corporate entities, such as enterprises and cloud-computing providers, typically include a significant number of server devices and managed client devices on a computer network. The infrastructure required to service these devices on the network has various complex settings that need to be configured, and the infrastructure services provision the devices on the network with IP addresses and other network configuration settings. A typical enterprise generally includes a large number of these infrastructure services distributed throughout the network, and for configuration or troubleshooting scenarios, a network and/or system administrator needs to update various entities that have single or multiple infrastructure services. The entity management of a typical multi-entity management system is a multi-step process for actions such as to configure, overwrite, append, delete, and find-and-replace. All of the many processes for management operation by a network and/or system administrator is all the more complex for the large number of entities of infrastructure services that are servicing the thousands of client devices in the network with the network configuration settings, such as for example, DHCP (dynamic host configuration protocol) scope options and scope properties, as well as DHCP server options and server properties. Maintaining, troubleshooting, and repairing a large network is manually intensive and time consuming for an administrator.

A network and/or system administrator can utilize a typical multi-management framework to facilitate managing a large network that may include servicing of thousands of client devices with network configuration settings. However, a conventional multi-management framework only provides for single-entity operations, such as to overwrite or set a configuration setting of a configuration object (e.g., DHCP scope option) of an entity (e.g., DHCP scope), or to append an array of settings with a value for a single entity. The conventional multi-management framework does not provide for multi-entity configuration setting changes. For example, updating a network configuration setting on multiple client devices throughout a large network involves updating the configuration objects of the infrastructure services that are servicing the many client devices. Updates, such as to find a value from a collection of values for an object across the multiple entities and replace the value with a new value, is not supported. Rather, the typical multi-management framework technique to update, append, or find-and-replace a value for an object across multiple entities is to delete the object and then create a new object with the updated, appended, or replaced value.

SUMMARY

This Summary introduces simplified concepts of multi-entity management, and the concepts are further described below in the Detailed Description and/or shown in the Figures. This Summary should not be considered to describe essential features of the claimed subject matter, nor used to determine or limit the scope of the claimed subject matter.

Multi-entity management is described. In embodiments, a multi-entity system can include an infrastructure service (e.g., DHCP) that services client devices configured for network connectivity on a network. A multi-entity manager instantiates a configuration dialog for display with user-selectable controls that are selectable to initiate a single-step configuration operation of one or more of the network configuration settings for the DHCP entities, such as scope properties, scope options, classes, server properties, and server options.

In embodiments, the single-step configuration operation can be one of: an overwrite operation to change a value of a network configuration setting; an append operation to append a value to an array of values of a network configuration setting; a find-and-replace operation to find a value and replace the value of a network configuration setting; or a delete operation to delete a value of a network configuration setting. The configuration dialog is implemented for selection of multiple network entities having multiple configured objects, and for selection of the single-step configuration operation to edit selected ones of the multiple configured objects.

BRIEF DESCRIPTION OF THE DRAWINGS

Embodiments of multi-entity management are described with reference to the following Figures. The same numbers may be used throughout to reference like features and components that are shown in the Figures.

DETAILED DESCRIPTION

Embodiments of multi-entity management are described. A network and/or system administrator (also referred to as an IT administrator) can select multiple entities with multiple configured objects that have a single setting or a collection of settings to perform an overwrite, append, delete, or find-and-replace operation in a single-step configuration operation. The single-step configuration operations can each be executed on a list of managed entities in a large network, such as on a resultant filtered set of network configuration settings at multiple client devices that are connected in the network. The single-step configuration operations can be conditional within a configuration dialog that is displayable in a user interface, from which the network administrator can initiate a single-step configuration operation.

The configuration dialog is flexible and the network and/or system administrator can easily change and configure network configuration settings for quick and efficient administrative response. Embodiments of multi-entity management provide a mechanism by which the administrator can manage the multi-entity system and implement the single-step configuration operations, such as an overwrite, append, delete, or find-and-replace operation performed in a single-step configuration. Embodiments of multi-entity management also improve the management operation for a large number of complex managed entities in a network with multiple configuration settings like DHCP scope options and scope properties, and DHCP server options and server properties.

While features and concepts of multi-entity management can be implemented in any number of different devices, systems, network, environments, and/or configurations, embodiments of multi-entity management are described in the context of the following example devices, systems, and methods.

Figure 1:
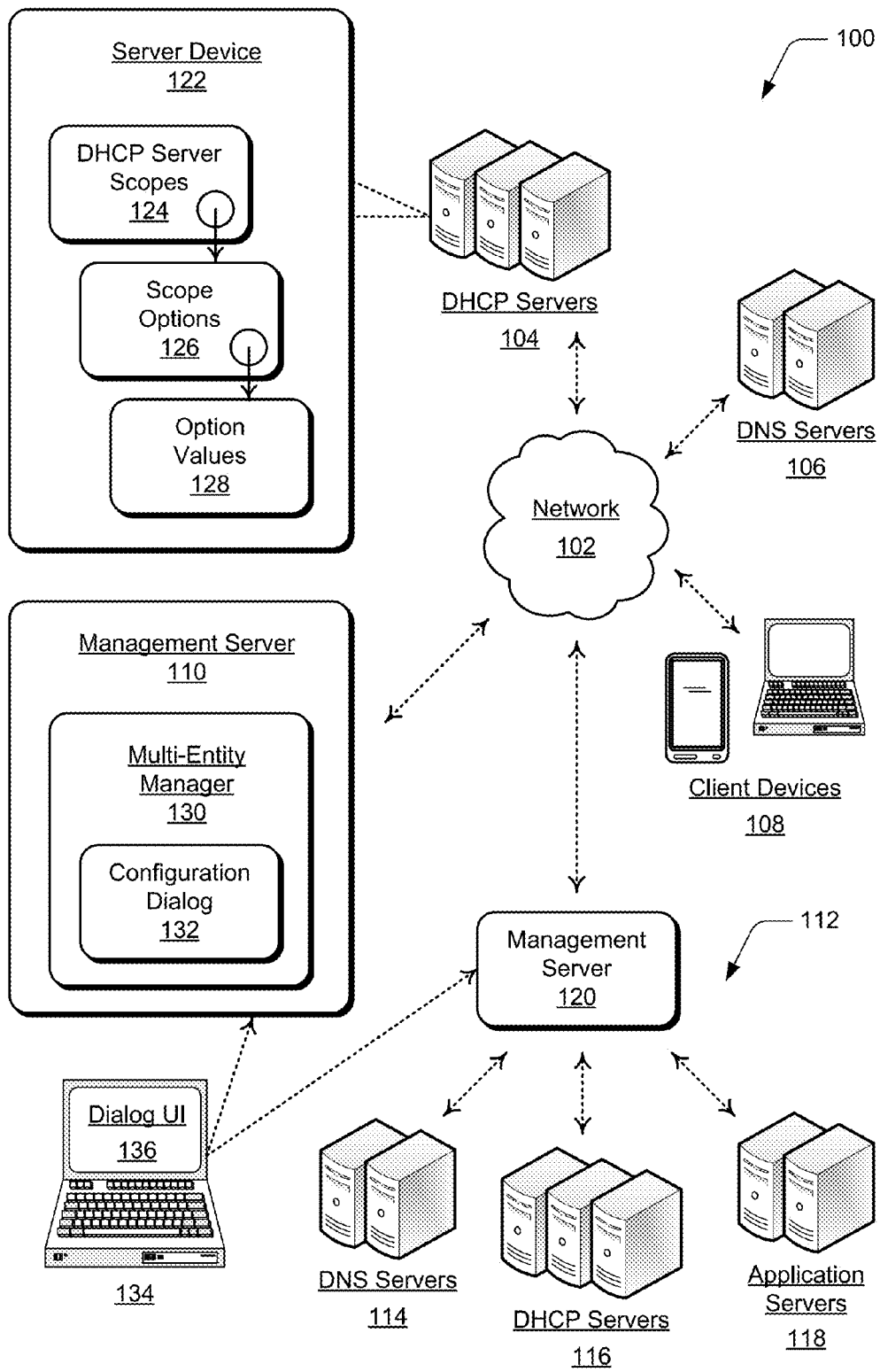
FIG. 1 illustrates an example multi-entity system in accordance with one or more embodiments of multi-entity management.

FIG. 1 illustrates an example multi-entity system 100 in which various embodiments of multi-entity management can be implemented. The example system includes a network 102, such as a private or corporate network and/or an enterprise computer network. The network can be implemented to include wired and/or wireless networks, and can also be implemented using any type of network topology and/or communication protocol. The network may be represented or otherwise implemented as a combination of two or more networks, to include IP-based networks and/or the Internet.

In this example, the multi-entity system 100 includes multiple DHCP (dynamic host configuration protocol) servers 104, DNS (domain name system) servers 106, multiple client devices 108, and a management server 110. The multi-entity system also includes the network extended at 112, such as a datacenter or an extension of an enterprise, that includes other DNS servers 114, DHCP servers 116, application servers 118, and another management server 120. The multi-entity system may also include any other type of networked computing devices, server devices, and services implemented by devices. The client devices 108 can include any wired and/or wireless devices, and may be implemented as user devices, portable devices, computer devices, and/or networked devices. Any of the servers and/or client devices can be implemented with various components, such as one or more processors and memory devices, as well as any number and combination of differing components as further described with reference to the example device shown in FIG. 5 to implement embodiments of multi-entity management.

The server device 122 is an example implementation of any one of the DHCP servers 104 and 116. A server device in the multi-entity system may have four or more levels of dimensions, and the network of the multi-entity system can include a large number of servers and its entities. A system may include multiple DHCP servers, where each server includes multiple DHCP scopes, each server scope includes multiple scope options, and each server scope option includes an array of values. DHCP options can be configured for specific values and enabled for assignment and distribution to DHCP clients based on either server, scope, class or client-specific levels.

In the example multi-entity system 100, the example server device 122 includes DHCP server scopes 124, which each include multiple scope options 126, and each server scope option may include multiple option values 128. The server scope options 126 and option values 128 are pushed out to the network client devices 108 as network configuration settings and information, such as a default gateway identifier, software configuration information, a proxy server address, a time server address, an IP address, a MAC address, a list of DNS servers, etc. For example, a computer client device has configuration information such as an IP address, a MAC address, a list of DNS servers the device is configured with, other network configuration settings, and other properties that are serviced by a DHCP scope from a DHCP server.

In implementations, the management servers 110, 120 are IP address management (IPAM) servers implemented as multi-entity managers. For example, the management server 110 communicates with the DHCP servers 104 and the DNS servers 106, as well as with domain controllers (DC) and network policy servers (NPS) (not shown), to manage network configuration settings on the DHCP and DNS servers. Similarly, the management server 120 communicates with the DNS servers 114 and the DHCP servers 116 to manage network configuration settings on the DHCP and DNS servers. Network configuration settings of the client devices 108 are stored on the DHCP servers 104 and the DNS servers 106. Configurations of the servers, as well as the network configurations of the client devices, can be updated on the DHCP and DNS servers, and the servers then propagate the changes to the client devices as defined by respective DHCP and DNS roles.

In this example, the management server 110 includes a multi-entity manager 130 that instantiates a configuration dialog 132 for display with user-selectable controls that are selectable to initiate a single-step configuration operation of one or more of the server configurations and network configuration settings for the client devices 108 that are updated on the DHCP servers 104 and the DNS servers 106. In implementations, the multi-entity manager 130 and the configuration dialog 132 can be implemented as computer-executable instructions, such as software applications, and executed by one or more processors to implement the various embodiments described herein. Further, although the multi-entity manager 130 is shown as a component of the management server 110 in the example system, the multi-entity manager may be implemented as a separate entity, or as a component of any one of the servers and/or devices.

A network and/or system administrator may use a computing device 134 to display a configuration dialog user interface 136 that is run from the management server 110. From the configuration dialog user interface, the administrator can initiate a single-step configuration operation, such as an overwrite operation to change an option value of a network configuration setting; an append operation to append a value to an option value of a network configuration setting; a find-and-replace operation to replace an option value of a network configuration setting; or a delete operation to delete an option value of a network configuration setting. For example, a DNS server in the multi-entity system may fail, in which case all of the entities are updated with new configuration information to update the address for a new DNS server replacement. For example, in the dialog user interface, the network administrator can select a set of DHCP scopes or DHCP servers, set the fields, and apply the configuration to seamlessly update all of the entities in the multi-entity system.

In embodiments, a network and/or system administrator can select multiple entities with multiple configured objects that that have single settings or a collection of settings and perform an overwrite, append, delete, or find-and-replace operation in a single step. For an overwrite operation, an object is selected in the dialog user interface to be overwritten and in the empty set of fields, the values to be overwritten are provided. The same can be repeated for multiple objects in the same dialog and apply the configuration. For an append operation, an object is selected in the dialog user interface to append a particular value and in the empty set of fields, the values to be appended are provided. The same can be repeated for multiple objects in the same dialog and apply the configuration. For a find-and-replace operation, the value to find and the value to replace is provided in the empty set of fields in the dialog user interface. The same can be repeated for multiple objects in the same dialog and apply the configuration. For a delete operation, an object is selected to be deleted in the dialog user interface. The same can be repeated for multiple objects in the same dialog and apply the configuration. All of the described operations can be executed on the list of managed entities, such as on a filtered resultant set or otherwise.

Figure 2:
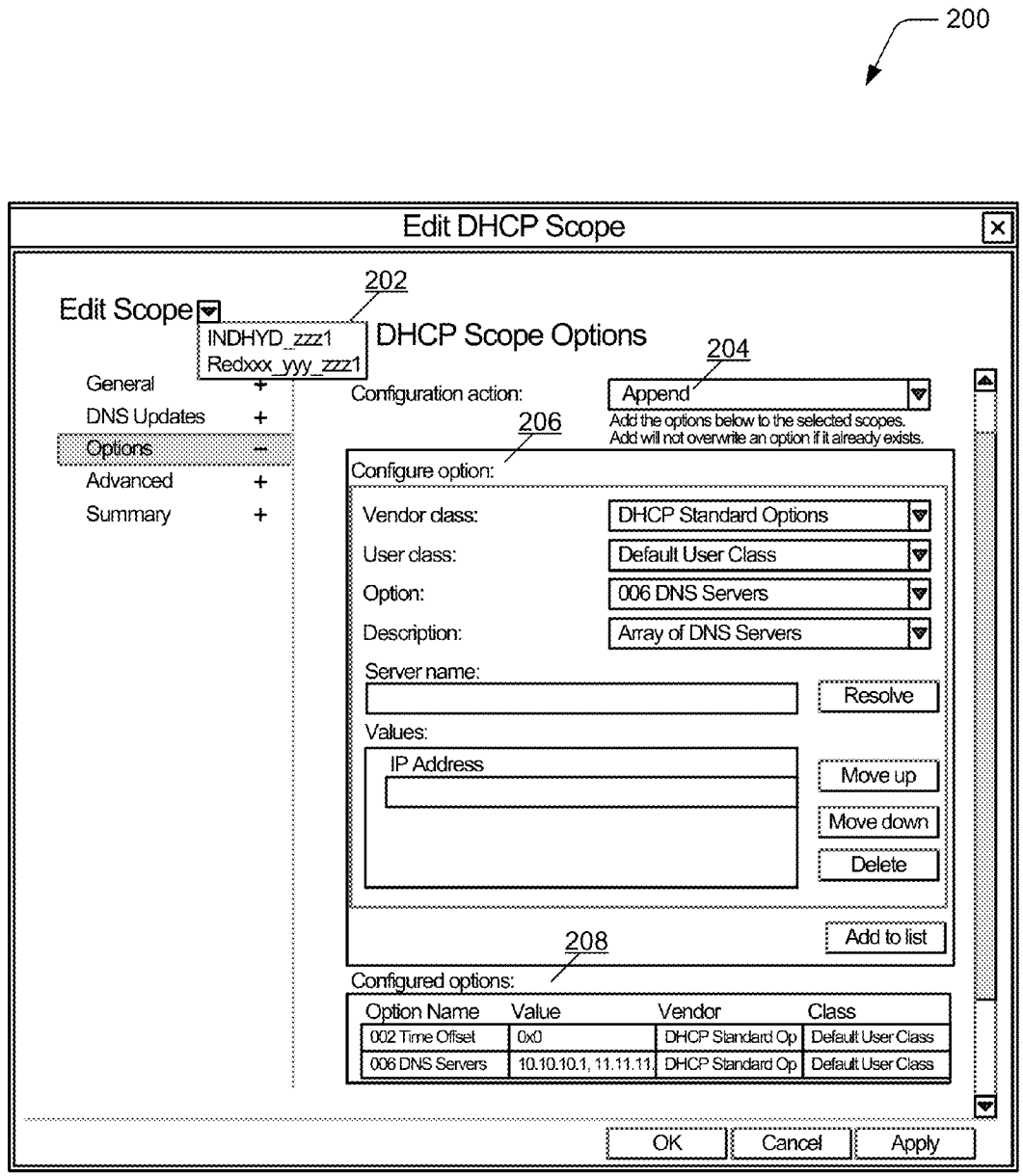
FIG. 2 illustrates an example of a configuration dialog user interface in accordance with one or more embodiments of multi-entity management.

FIG. 2 illustrates an example 200 of a configuration dialog user interface in accordance with one or more embodiments of multi-entity management as described herein. In this example, the configuration dialog is implemented to edit DHCP scope, and two properties of two DHCP scopes are selected for modification. Although only two DHCP scopes are shown selected in this example, any other object types can be selected for multi-edit in embodiments of multi-entity management, and there is no upper limit on the number of scopes selected. The number of selected scopes to edit may be in the tens or hundreds (but there is no upper limit of this typical example), and can apply to different DHCP servers. In this example, the two selected DHCP scopes are listed at 202 and the configuration operation to Append is shown selected at 204. In the drop-down menu, a network and/or system administrator may also select other configuration operations, such as an overwrite, delete, or find-and-replace operation. The administrator can also select configuration options at 206 to configure the selected DHCP scopes. For example, multiple options can be added to multiple scopes that are associated with multiple servers. Two of the configured options are shown at 208, such as to append to the selected DHCP scopes.

Figure 3:
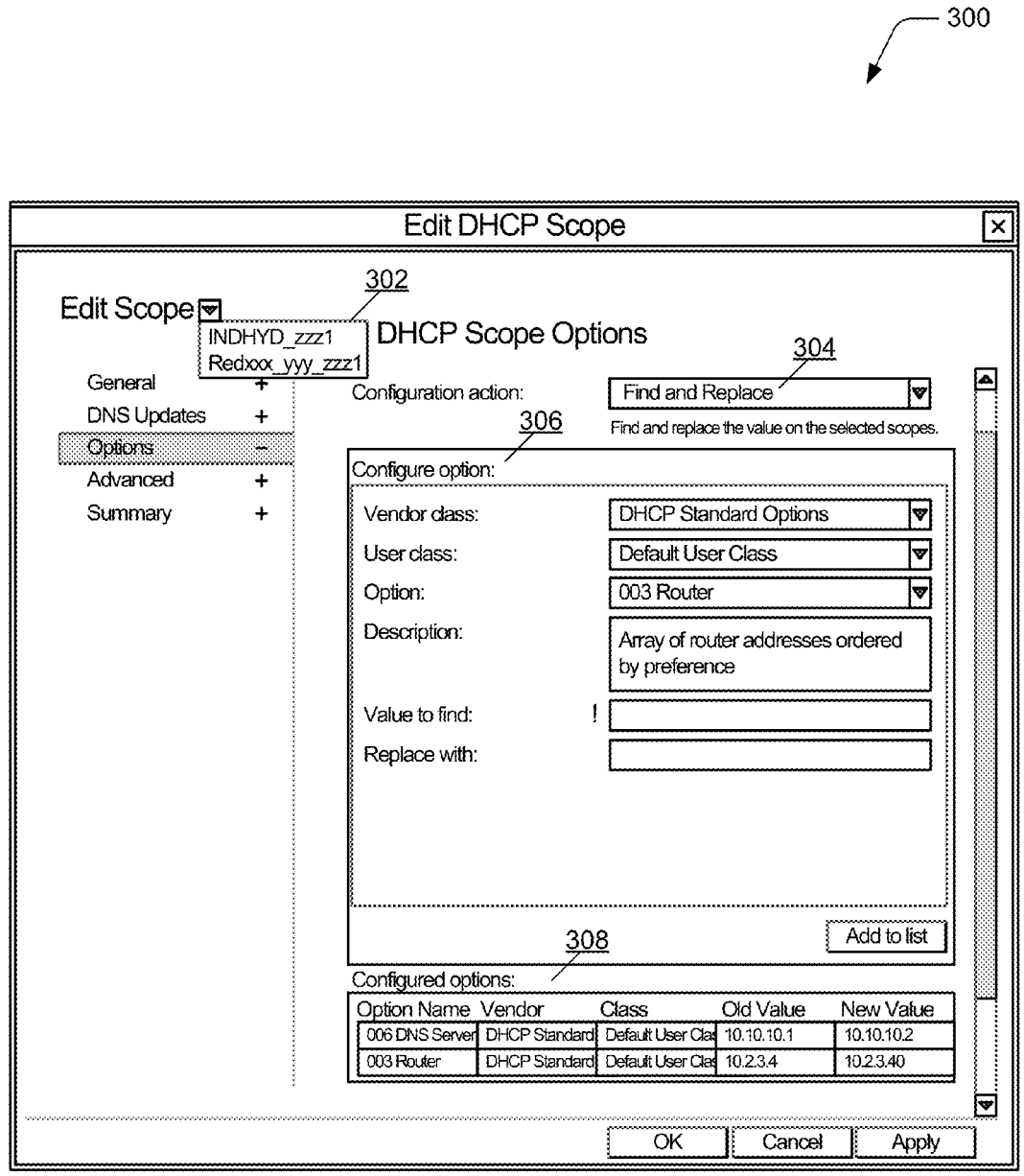
FIG. 3 illustrates another example of a configuration dialog user interface in accordance with one or more embodiments of multi-entity management.

FIG. 3 illustrates another example 300 of a configuration dialog user interface in accordance with one or more embodiments of multi-entity management as described herein. In this example, the configuration dialog is implemented to edit DHCP scope, and two properties of two DHCP scopes are selected for modification. Although only two DHCP scopes are shown selected in this example, any other object types can be selected for multi-edit in embodiments of multi-entity management, and there is no upper limit on the number of scopes selected. The number of selected scopes to edit may be in the tens or hundreds (but there is no upper limit of this typical example), and can apply to different DHCP servers. In this example, the two selected DHCP scopes are listed at 302 and the configuration operation to Find and Replace is shown selected at 304. In the drop-down menu, a network and/or system administrator may also select other configuration operations, such as an append, overwrite, or delete operation.

The administrator can also select configuration options at 306 to configure the selected DHCP scopes. For example, a find-and-replace configuration operation can be applied to multiple scopes on multiple servers for multiple options having multiple values, of which only one option value is being selectively replaced. Two of the configured options are shown at 308, such for a DNS server option value 10.10.10.1 being replaced by option value 10.10.10.2 for the 006 DNS server in a multi-entity system. Similarly, a router option value 10.2.3.4 is being replaced by option value 10.2.3.40 for the 003 router in the multi-entity system.

Example method 400 is described with reference to FIG. 4 in accordance with one or more embodiments of multi-entity management. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
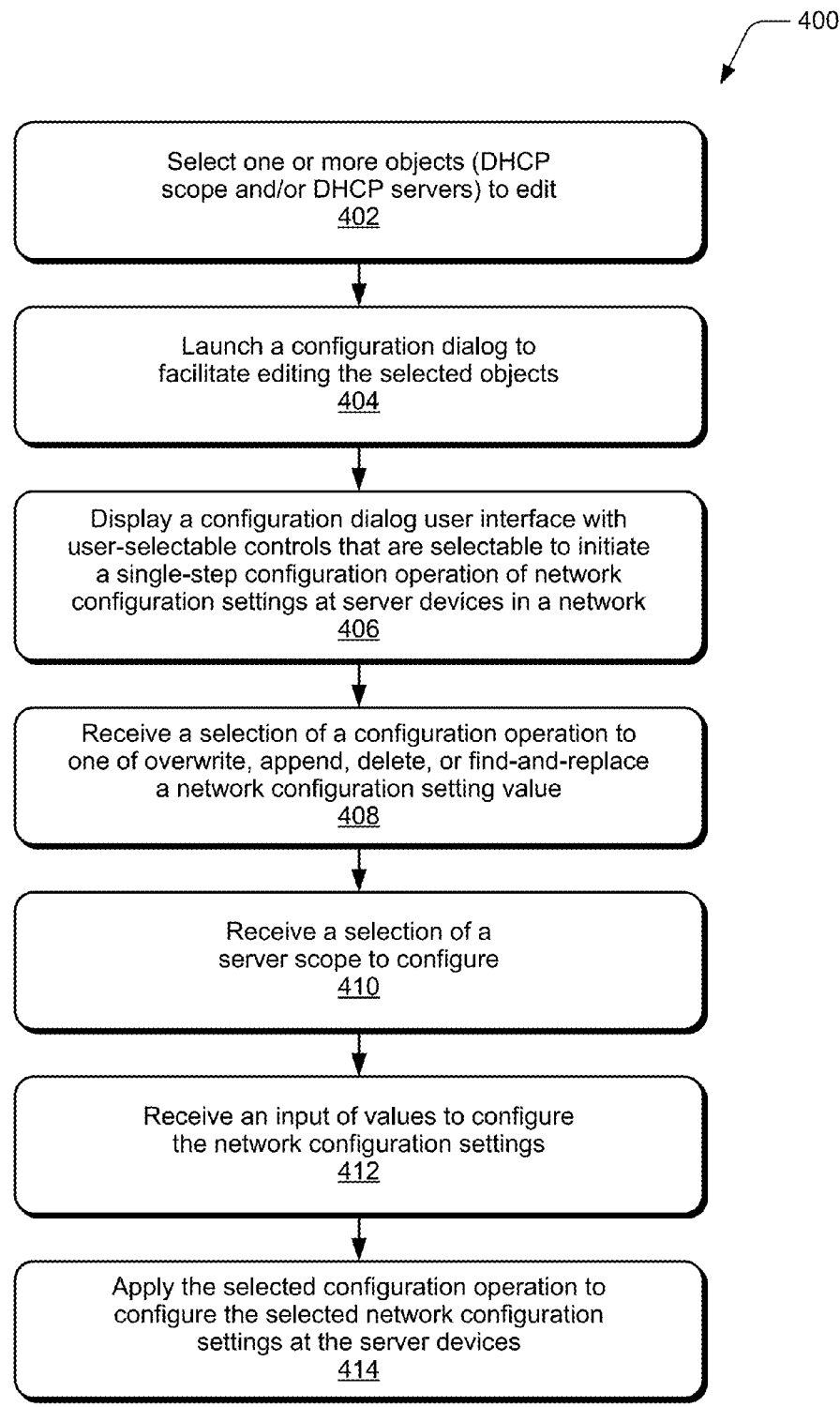
FIG. 4 illustrates example method(s) of multi-entity management in accordance with one or more embodiments.

FIG. 4 illustrates example method(s) 400 of multi-entity management. The order in which the method blocks are described are not intended to be construed as a limitation, and any number of the described method blocks can be combined in any order to implement a method, or an alternate method.

At block 402, one or more objects (e.g., DHCP scope and/or DHCP servers) are selected to edit. For example, the objects are selected from within the multi-entity manager 130 at the management server 110 (FIG. 1). At block 404, a configuration dialog is launched to facilitate editing the selected objects. For example, the configuration dialog 132 is launched from the multi-entity manager 130.

At block 406, a configuration dialog is displayed with user-selectable controls that are selectable to initiate a single-step configuration operation of one or more network configuration settings at server devices in a network. For example, the multi-entity manager 130 at the management server 110 initiates a configuration dialog 132 that is displayed as a configuration dialog user interface 136. Examples of the configuration dialog user interface are shown in FIGS. 2 and 3. The configuration dialog includes user-selectable controls that are selectable to initiate a single-step configuration operation of one or more network configuration settings on DHCP entities of the DHCP servers 104 and 116 on the network 102.

At block 408, a selection of a configuration operation is received to one of overwrite, append, delete, or find-and-replace a network configuration setting value. For example, the multi-entity manager 130 at the management server 110 receives a selection of a configuration operation in the configuration dialog user interface 136 to one of overwrite, append, delete, or find-and-replace a network configuration setting value.

At block 410, a selection of server scopes to configure is received and, at block 412, an input of values to configure the network configuration settings is received. For example, the multi-entity manager 130 at the management server 110 receives a selection of server scopes to configure, as well as a selection of scope values to configure in the configuration dialog user interface 136. At block 414, the selected configuration operation is applied to configure the selected network configuration settings and/or server scope values at the server devices. For example, the multi-entity manager 130 at the management server 110 applies the selected configuration operation to configure the selected server scope values at the server devices in the network 102.

Figure 5:
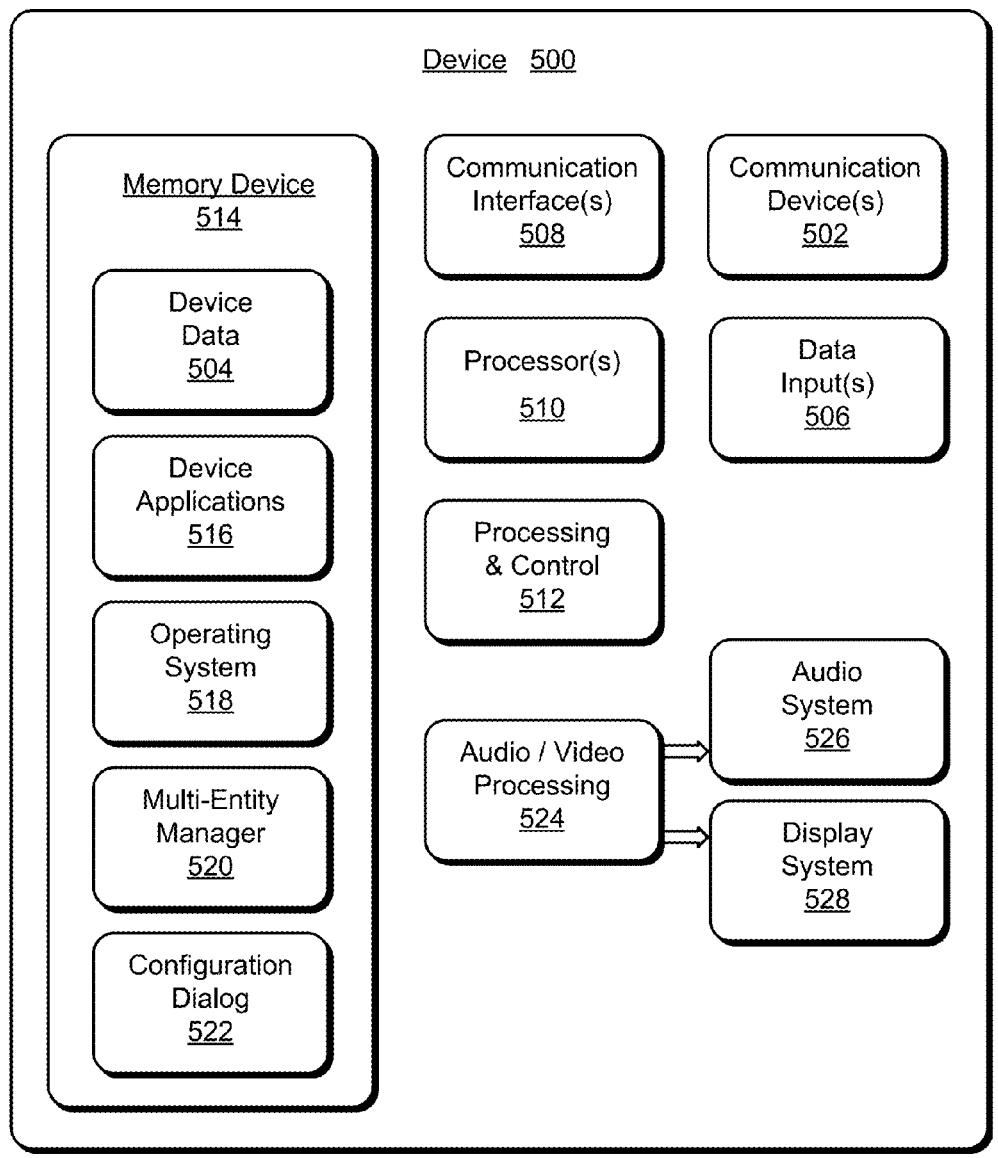
FIG. 5 illustrates various components of an example device that can implement embodiments of multi-entity management.

FIG. 5 illustrates various components of an example device 500 that can be implemented as any of the devices, server devices, or services implemented by devices, described with reference to the previous FIGS. 1-4. The example device 500 includes communication devices 502 that enable wired and/or wireless communication of device data 504, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data.

The device includes one or more data inputs 506 via which any type of data, media content, and/or inputs can be received, such as user-selectable inputs and any other type of audio, video, and/or image data received from any content and/or data source. The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 512. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 514 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 514 provides data storage mechanisms to store the device data 504, other types of information and/or data, and various device applications 516. For example, an operating system 518 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 516 include a multi-entity manager 520 and a configuration dialog 522 that implements embodiments of multi-entity management as described herein.

The device 500 also includes an audio and/or video processing system 524 that generates audio data for an audio system 526 and/or generates display data for a display system 528. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of multi-entity management have been described in language specific to features and/or methods, the appended claims are not necessarily limited to the specific features or methods described. Rather, the specific features and methods are disclosed as example implementations of multi-entity management.

What is claimed is:

1. A multi-entity system, comprising:
   a plurality of server devices configured for control and management of network configuration settings for a plurality of client devices on a network; and
   a multi-entity manager configured to instantiate a configuration dialog for display with user-selectable controls for:
      selecting a single-step configuration operation, wherein the single-step configuration operation comprises at least one of: an overwrite operation to change a value of a DHCP server scope at the plurality of the server devices, an append operation to append a value to an array of values of a DHCP server scope at the plurality of the server devices, and a find-and-replace operation to find a value and replace the value of a DHCP server scope at the plurality of the server devices; and
      editing one or more of the DHCP server scopes, wherein the selected single-step configuration operation is executed at each of the plurality of the server devices to configure the one or more DHCP server scopes at the plurality of the server devices.

2. A multi-entity system as recited in claim 1, wherein the single-step configuration operation comprises a delete operation to delete a value of a network configuration setting at the server devices.

3. A multi-entity system as recited in claim 1, wherein the configuration dialog is configured for selection of multiple network entities having multiple configured objects, and selection of the single-step configuration operation to one of overwrite, append, delete, or find-and-replace a value of the multiple configured objects.

4. A multi-entity system as recited in claim 1, wherein the configuration dialog is configured for: selection of the single-step configuration operation to one of overwrite, append, delete, or find-and-replace an option value of a network configuration setting; selection of a server device scope; selection of a scope option; and selection of the option value to configure the network configuration setting at the server devices.

5. A method, comprising:
   displaying a configuration dialog user interface with user-selectable controls that are selectable to edit one or more DHCP server scopes for a plurality of server devices in a network;
   receiving a selection of a single-step configuration operation, wherein the single-step configuration operation comprises at least one of: an overwrite operation to change a value of a DHCP server scope at the plurality of the server devices, an append operation to append a value to an array of values of a DHCP server scope at the plurality of the server devices, and a find-and-replace operation to find a value and replace the value of a DHCP server scope at the plurality of the server devices;

receiving a selection of one of the one or more DHCP server scopes;

receiving an input value to configure one of the one or more DHCP server scopes; and applying the selected single-step configuration operation, wherein, upon applying the single-step configuration operation, the input value is applied at each of the plurality of server devices.

6. A method as recited in claim 5, wherein the single-step configuration operation comprises a delete operation to delete the selected values of the one or more network configuration settings at the server devices.

7. A multi-entity manager for multi-entity management, the multi-entity manager comprising:
a user-selectable scope control configured for selection of one or more server scopes to be edited; and
a configuration dialog user interface comprising:
a user-selectable operation control configured for selection of a single-step configuration operation for one or more network configuration settings at a plurality of DHCP server devices in a network, wherein the single-step configuration operation comprises at least one of: an overwrite operation to change a value of a network configuration setting at the plurality of the server devices, an append operation to append a value to an array of values of a network configuration setting at the plurality of the server devices, and a find-and-replace operation to find a value and replace the value of a network setting at the plurality of the server devices;
a user-selectable option control configured for receiving a selection of one or more scope options of the one or more server scopes; and
a value input field configured for receiving one or more option value inputs of the one or more scope options, wherein, upon receiving a selection of a scope option and an option value, the option value is applied to each of the plurality of DHCP server devices.

8. A multi-entity manager as recited in claim 7, wherein the single-step configuration operation is applied to the selected one or more server scopes.

9. A multi-entity manager as recited in claim 7, wherein the user-selectable operation control is configured for selection of a delete configuration operation to delete the one or more selected option values of the one or more selected option values of the one or more selected scope options of the one or more selected server scopes.

10. A multi-entity system as recited in claim 1, wherein selecting the overwrite single-step configuration operation further comprises receiving, by the multi-entity manager, a customized value for changing a value of a network configuration setting at the plurality of server devices.

11. A multi-entity system as recited in claim 1, wherein selecting the append single-step configuration operation further comprises receiving, by the multi-entity manager, a customized value for appending to an array of values of a network configuration setting at the plurality of server devices.

12. A multi-entity system as recited in claim 1, wherein selecting the find-and-replace configuration operation further comprises receiving, by the multi-entity manager, a customized value for finding and replacing the value of a network setting at the plurality of the server devices.

13. A method as recited in claim 5, wherein receiving the selection of the overwrite single-step configuration operation further comprises receiving a customized value for changing a value of a network configuration setting at the plurality of server devices.

14. A method as recited in claim 5, wherein receiving the selection of the append single-step configuration operation further comprises receiving a customized value for appending to an array of values of a network configuration setting at the plurality of server devices.

15. A method as recited in claim 5, wherein receiving the selection of the find-and-replace single-step configuration operation further comprises receiving a customized value for finding and replacing the value of a network setting at the plurality of the server devices.

16. A multi-entity manager as recited in claim 7, wherein the user-selectable operation control is configured for receiving a customized value for changing a value of a network configuration setting at the plurality of server devices.

17. A multi-entity manager as recited in claim 7, wherein the user-selectable operation control is configured for receiving a customized value for appending to an array of values of a network configuration setting at the plurality of server devices.

18. A multi-entity manager as recited in claim 7, wherein the user-selectable operation control is configured for receiving a customized value for finding and replacing the value of a network setting at the plurality of server devices.

* * * * *